United States Patent
Park et al.

(10) Patent No.: US 7,525,985 B2
(45) Date of Patent: Apr. 28, 2009

(54) APPARATUS FOR COLLISION RESOLUTION AMONG HOME NETWORKING STATIONS USING CARRIER SENSE SIGNAL

(75) Inventors: Chan Won Park, Daejeon (KR); Jong Won Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1073 days.

(21) Appl. No.: 10/633,157

(22) Filed: Jul. 31, 2003

(65) Prior Publication Data

US 2004/0114619 A1    Jun. 17, 2004

(30) Foreign Application Priority Data

Dec. 12, 2002    (KR)    ............ 10-2002-0079271

(51) Int. Cl.
  *H04L 12/413*    (2006.01)
  *H04Q 7/24*    (2006.01)
  *G01R 31/08*    (2006.01)

(52) U.S. Cl. .............. 370/445; 370/446; 370/447; 370/448

(58) Field of Classification Search .......... 370/445–448
See application file for complete search history.

(56) References Cited

U.S. PATENT DOCUMENTS

| | | | |
|---|---|---|---|
| 6,256,317 B1 * | 7/2001 | Holloway et al. | 370/447 |
| 6,760,305 B1 * | 7/2004 | Pasternak et al. | 370/230 |
| 6,961,344 B1 * | 11/2005 | Gaspar et al. | 370/447 |
| 7,298,757 B1 * | 11/2007 | Lin et al. | 370/447 |
| 2002/0057713 A1 * | 5/2002 | Bagchi et al. | 370/468 |
| 2007/0263654 A1 * | 11/2007 | Salokannel et al. | 370/448 |
| 2008/0013567 A1 * | 1/2008 | Benveniste | 370/447 |

OTHER PUBLICATIONS

A design o fhigh speed parallel PRNG circuit in HomePNA technology, 16 pages.
Packet-switched multiple-access network system with distributed fair priority queuing, pp. 1-18.
Method and protocol for complete collision avoidance contention resolution in local area networks, 16 pages.
A design of high speed parallel PRNG circuit in HomePNA technology, 16 pages, Nov. 28-29, 2002.
Packet-switched multiple-access network system with distributed fair priority queuing, pp. 1-18, 2000.
Method and protocol for complete collision avoidance contention resolution in local area networks, 16 pages, 1998.

* cited by examiner

*Primary Examiner*—Seema S. Rao
*Assistant Examiner*—Xavier Szewai Wong
(74) *Attorney, Agent, or Firm*—Blakely, Sokoloff, Taylor & Zafman LLP

(57) ABSTRACT

An apparatus for collision resolution among home networking stations using carrier sense. More specifically, an apparatus for collision resolution among home networking stations using Media Access Control (MAC) in the HomePNA 2.0 specification for constructing home networks is provided. The apparatus provides collision resolution to a larger number of stations than the number of stations protected by the HomePNA specification. In addition, the apparatus prevents the generation of errors caused by incorrect calculation of the number of back-off signals in the case of a carrier sense signal.

7 Claims, 7 Drawing Sheets

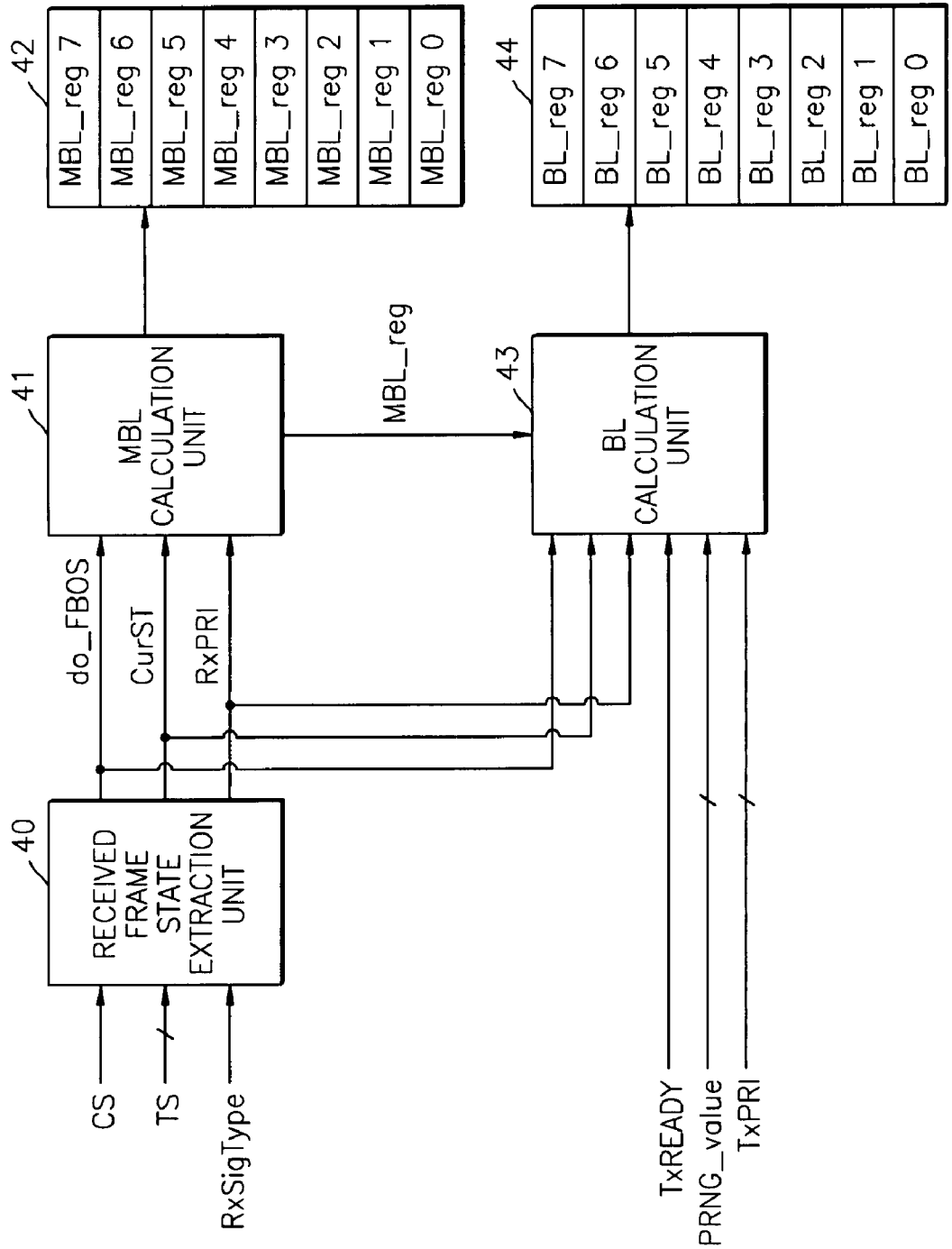

US 7,525,985 B2

APPARATUS FOR COLLISION RESOLUTION AMONG HOME NETWORKING STATIONS USING CARRIER SENSE SIGNAL

BACKGROUND OF THE INVENTION

This application claims the priority of Korean Patent Application No. 2002-79271, filed on Dec. 12, 2002 in the Korean Intellectual Property Office, which is incorporated herein in its entirety by reference.

1. Field of the Invention

The present invention relates to an apparatus for collision resolution among home networking stations using carrier sense signals, and more particularly, to an apparatus for collision resolution among home networking stations using Media Access Control (MAC) according to the HomePNA 2.0 specification for constructing home networks.

2. Description of the Related Art

The Home Phoneline Networking Alliance (HomePNA) is a non-profit association of more than a hundred companies working to ensure adoption of a single unified a phoneline networking industry standard.

The HomePNA was founded in June 1998 by 3Com Corporation, Advanced Micro Devices, Inc., AT&T, Wireless Services Corporation, Compaq Computer Corporation, Conexant Systems, Inc., Broadcom Corporation, Hewlett-Packard Company, IBM, Intel Corporation, Lucent Technologies, Rockwell Semiconductor Systems, and Tut Systems. Current participant membership has increased to include companies spanning the networking, telecommunications, hardware, software, and consumer electronics industries.

The HomePNA was founded due to increasing demand for home networking, as a result of the proliferation of multifunctional, interconnected personal computers (PC). In addition, the HomePNA was founded to facilitate sharing of resources among multiple PCs, including network games, peripherals, files, and application programs. The participant members of the HomePNA focus on developing an open standard that ensures interoperability among products from different companies. In addition, the participant members have determined that home networking should operate over a home's existing copper phonelines. Accordingly, the use of existing wiring infrastructure achieves the HomePNA goal of simplifying the construction of home networking.

HomePNA's 1.0 specification was used to construct a local area network interoperable with Ethernet and operate at 1 Mbps without use of a hub, a router, a splitter, or a terminator. A maximum of twenty-five computers, peripherals, and networking devices can connect to the home network via adaptors.

The HomePNA released the HomePNA 2.0 specification on Dec. 1, 1999. The HomePNA 2.0 specification also uses existing phonelines, however, the HomePNA 2.0 specification operates at 10 Mbps. The new specification, while interoperable with the HomePNA 1.0 specification, is designed to provide a faster networking environment capable of supporting voice, video, and data in the future.

Under the HomePNA 2.0 specification, the crucial point of home networking construction is to provide collision resolution among stations that share the network.

In order to provide collision resolution, the HomePNA 2.0 specification uses a collision-resolution algorithm called a Distributed Fair Priority Queuing (DFPQ). When collision occurs among stations having the same transmission priority, the DFPQ determines the data transmission order of the stations.

Since the DFPQ of the HomePNA 2.0 specification uses 4-bit maximum back-off level (MBL) and back-off level (BL) counters, the DFPQ of the HomePNA 2.0 specification can provide collision resolution to a maximum of 16 stations. Since a maximum of 25 stations can be connected in the HomePNA network, a maximum of 25 collisions may occur in the HomePNA network. Thus, the DFPQ of the HomePNA 2.0 specification cannot provide collision resolution for all configurations permitted in a HomePNA network.

In addition, the DFPQ of the HomePNA 2.0 specification counts the number of back-off signals using the MBL counter and the BL counter in the back-off sections. However, when error or ripples of carrier sense signals occur, the use of counters could lead to incorrect calculation of the number of back-off signals. This might result in further loss of resolution from collision,

SUMMARY OF THE INVENTION

The present invention provides an apparatus for collision resolution among a larger number of home networking stations than the number of stations protected by the conventional HomePNA specification.

The present invention also provides an apparatus which improves upon the conventional method in the case where an error occurs in the carrier sense signals and subsequent back-off signal calculations are incorrect.

According to an aspect of the present invention, there is provided an apparatus for collision resolution among home networking systems using carrier sense signals. The apparatus comprises a received frame state extraction unit, which extracts a current state CurST of a frame received by a station that is connected to a network, a data transmission priority RxPRI of the received frame, and a reference time signal do_FBOS for determining the final state of the carrier sense signals; a maximum back-off level (MBL) calculation unit, which calculates MBL values MBL_reg based on the current state CurST, the priority RxPRI, and the reference time signal do_FBOS; MBL registers, which store the MBL values MBL_reg; a back-off level (BL) calculation unit, which calculates BL values BL_reg based on the current state CurST, the priority RxPRI, the reference time signal do_FBOS, and the MBL values MBL_reg; and BL registers, which store the BL values BL_reg.

BRIEF DESCRIPTION OF THE DRAWINGS

The above aspects and advantages of the present invention will become more apparent by describing in detail preferred embodiments thereof with reference to the attached drawings in which:

FIG. 4A is a block diagram illustrating an apparatus according to the present invention;

DETAILED DESCRIPTION OF THE INVENTION

Figure 1:
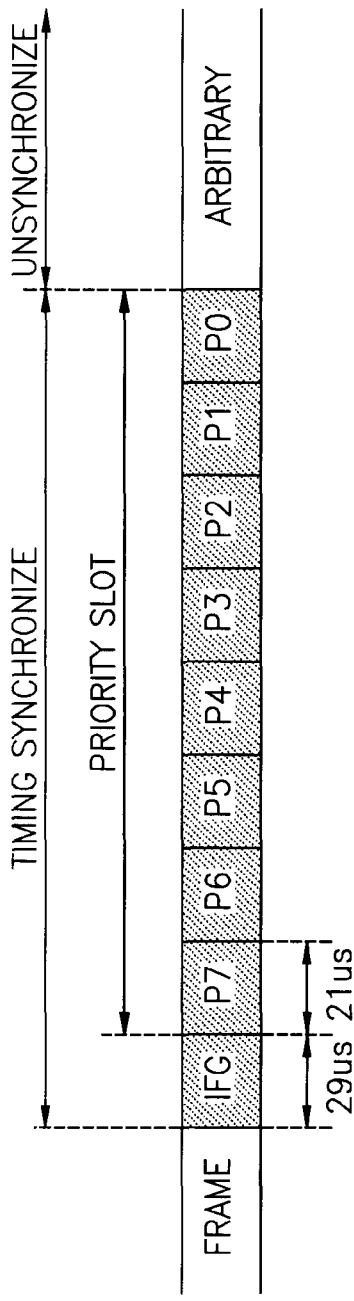
FIG. 1 illustrates the time slots following normal frame as described by the HomePNA 2.0 specification.

An apparatus for collision resolution among home networking stations using carrier sense signals will now be briefly described.

An apparatus for collision resolution that is included in a media access control (MAC) of a home networking system using a HomePNA 2.0 protocol, according to the present invention, is provided. The apparatus according to the present invention provides collision resolution among the stations by using transmission request signals, carrier sense (CS) signals, transmission priority, time slots, receiving signal types, pseudo random number generator (PRNG) values which are generated, a carrier sense device, MAC, and a PRNG of a conventional packet switch apparatus.

The apparatus according to the present invention precisely operates regardless of errors or ripples in the carrier sense signals, while satisfying the HomePNA 2.0 specification. In addition, the apparatus according to the present invention increases the maximum collision number to 25 in order to satisfy home networking environments.

The present invention will now be described more fully with reference to the accompanying drawings, in which preferred embodiments of the invention are shown. The same reference numerals in different drawings represent the same elements.

FIG. 1 illustrates the time slots following a normal frame, i.e., a case where collision does not occur, as described by the HomePNA 2.0 specification.

Referring to FIG. 1, the time period after a frame is organized into an interframe gap (IFG) section followed by eight priority slots P7 through P0 for data transmission. An arbitrary section for transmitting data at any time is located after the priority slot P0. A station on the network can transmit data only when its priority slot and the priority slot dictated by the network are equal.

Figure 2:
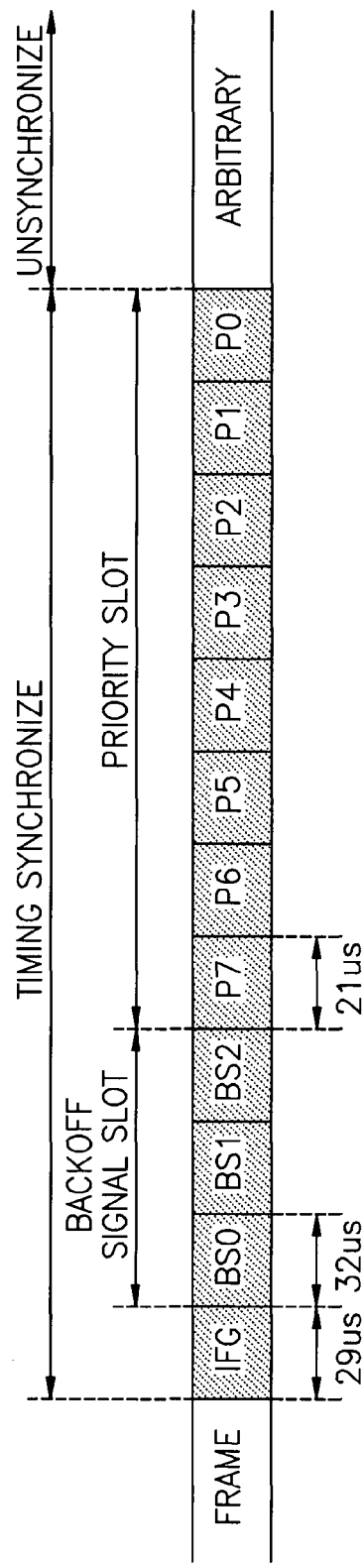
FIG. 2 illustrates the time slots when collision has occurred in a previous frame.

FIG. 2 illustrates the time slots in the case where a collision has occurred in a previous frame.

Three back-off slots BS0, BS1, and BS2 for collision resolution are assigned after the IFG section, followed by eight priority slots P7 through P0 for data transmission. When collisions occur, carrier sense signals are generated in the back-off section. Stations connected to the network then proceed to resolve the collisions with reference to the carrier sense signals. The detection and resolution of the collisions are performed by a distributed fair priority queuing (DFPQ) algorithm included in the MAC layer of the networking station.

Figure 3:
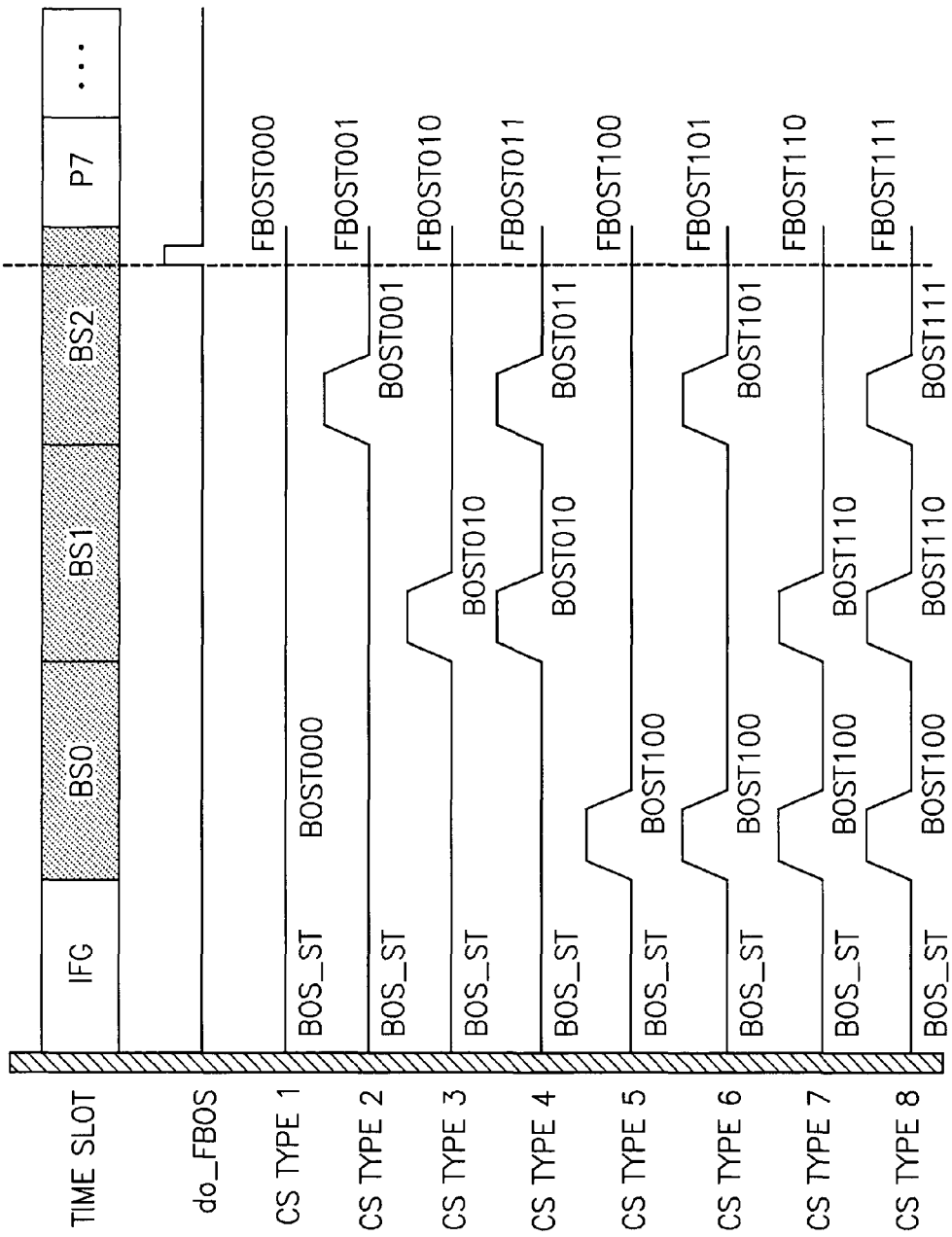
FIG. 3 illustrates plural types of carrier sense signals that can be present in a back-off section.

FIG. 3 illustrates a plurality of types of the carrier sense signal that can be present in the back-off section.

Referring to FIG. 3, the carrier sense signals can be present in each of the back-off slots BS0, BS1, and BS2. Since three back-off slots BS0, BS1, and BS2 are arranged, eight combinations, namely CS type 1 through CS type 8 of the carrier sense signals are possible. The collision resolution method according to the present invention differs from the conventional method in calculation of the number of carrier sense signals. The apparatus according to the present invention protects against collisions by designing a state machine according to the final state FBOST000 though FBOST111 of the carrier sense signals, determining the presence of the carrier sense signal by the back-off slot unit and inputting the value corresponding to the states of the carrier sense signal into registers.

A reference time signal do_FBOS which determines the final state of the carrier sense signals indicates when values are input into the maximum back-off level (MBL) registers and back-off level (BL) registers. Since the carrier sense signal continues for 10 μs, the carrier sense signal must start within 22 μs in the back-off slot BS2 having a time 32 μs. Thus, the reference time signal do_FBOS should be in an active state from 22 μs to 32 μs in the back-off slot BS2.

The states FBOST000 through FBOST111 represent the final states of the carrier sense signals when the reference time signal do_FBOS is in the active state. These final states determine the values input to the MBL registers and the BL registers.

The method for determining the values assigned to the registers will now be described with reference to Table 1.

Table 1 illustrates a method of assigning values to the MBL registers and the BL registers according to the type of the back-off signals in the back-off signal section of FIG. 3.

TABLE 1

| Type of the back-off signals | MBL MBL(−)=0 | MBL MBL(−)!=0 | BL | BL(Active) BL(−)=0 PRNG value 0 | 1 | 2 | BL(Active) BL(−)!=0 PRNG value 0 | 1 | 2 |
|---|---|---|---|---|---|---|---|---|---|
| FBOST000 | +0 | +0 | MBL | +0 | +0 | +0 | +0 | +0 | +0 |
| FBOST 001 | +1 | +0 | MBL | +0 | +0 | +0 | +0 | +0 | +0 |
| FBOST 010 | +1 | +0 | MBL | +0 | +0 | +1 | +0 | +0 | +0 |
| FBOST 011 | +2 | +1 | MBL | +0 | +0 | +1 | +0 | +0 | +0 |
| FBOST 100 | +1 | +0 | MBL | +0 | +1 | +1 | +0 | +0 | +0 |
| FBOST 101 | +2 | +1 | MBL | +0 | +1 | +1 | +0 | +0 | +0 |
| FBOST 110 | +2 | +1 | MBL | +0 | +1 | +2 | +0 | +0 | +1 |
| FBOST 111 | +3 | +2 | MBL | +0 | +1 | +2 | +0 | +0 | +1 |

Referring to Table 1, the station in which collision occurs selects a value from 0, 1, or 2 determined by the PRNG circuit in the MAC layer as a PRNG value. A back-off signal in a back-off slot corresponding to the selected value is output to the network. All of the stations increase the BL/MBL value in a do_FBOS section of FIG. 3 using the detected back-off signal, as in Table 1. If a next frame is determined as a normal frame in which collision does not occur, the BL/MBL value is obtained by subtracting 1 from the previous BL/MBL value in the IFG section.

The MBL value is calculated by adding all of the back-off signals in the back-off slot and indicates the number of the stations for performing DFPQ on the network. The BL value determines a transmission sequence and is calculated by adding only the number of the back-off signals prior to the PRNG value of the station in which collision occurs. Further, if the previous BL/MBL value is 0 in the do_FBOS section, a BL/MBL value is calculated by the above method. However, if the previous BL/MBL value is not 0, a BL/MBL value is obtained by subtracting 1 from a value calculated by the above method.

Table 1 indicates a value added to the BL/MBL register according to an input type of the back-off signal from FBOST000 to FBOST111 in the do_FBOS section. In Table 1, 'Passive' indicates an idle state (TxReady='0'), and 'Active' indicates a standby state (TxReady='1'). As indicated in Table 1, if the station is in a "Passive" state, the BL value is the same as a MBL value.

Accordingly, the present invention assigns values corresponding to the input type of the back-off signal during the active section of the reference time signal do_FBOS as shown in FIG. 1 instead of calculating the number of back-off signals in the back-off signal sections. The method for assigning the values will be described later.

FIG. 4A is a block diagram illustrating the apparatus according to the present invention.

A received frame state extraction unit 40 receives a predetermined signal from the MAC layer of a station (not shown) and extracts the current state of the received frame. In addition, the received frame state extraction unit 40 produces a current state signal CurST, a priority RxPRI of the received frame, and a reference signal do_FBOS. More specifically, the received frame state extraction unit 40 produces the current state signal CurST and the priority RxPRI of the received frame according to two state diagrams of FIGS. 4B and 4C, and generates the reference signal do_FBOS using a counter in the back-off slot BS2.

An MBL calculation unit 41 receives the signals from the received frame state extraction unit 40 and calculates the MBL values MBL_reg that are input to MBL registers 42. More specifically, the MBL calculation unit 41 calculates the MBL values MBL_reg that are input to the MBL registers 42 by using the flowchart of FIG. 5A.

A BL calculation unit 43 receives both the signals from the received frame state calculation unit 40 and the MBL values MBL_reg from the MBL calculation unit 41. The BL calculation unit 43 calculates the BL values BL_reg that are input to BL registers 44. More specifically, the BL calculation unit 43 calculates the BL values BL_reg that are input to the BL registers 44 by using the flowchart of FIG. 5B.

The MBL registers 42 are arranged in individual priority slots MBL_reg0 through MBL_reg7. In addition, each of the priority slots MBL_reg0 through MBL_reg7 is designed to accommodate more than 5 bits supporting 25 numbers. Accordingly, each of the MBL registers 42 can provide collision resolution to a maximum of 25 stations. The BL registers 44 are arranged in individual priority slots BL_reg0 through BL_reg7. In addition, each of the BL registers 44 is designed to accommodate 25 numbers and provide collision resolution to a maximum of 25 stations.

Figure 4B:
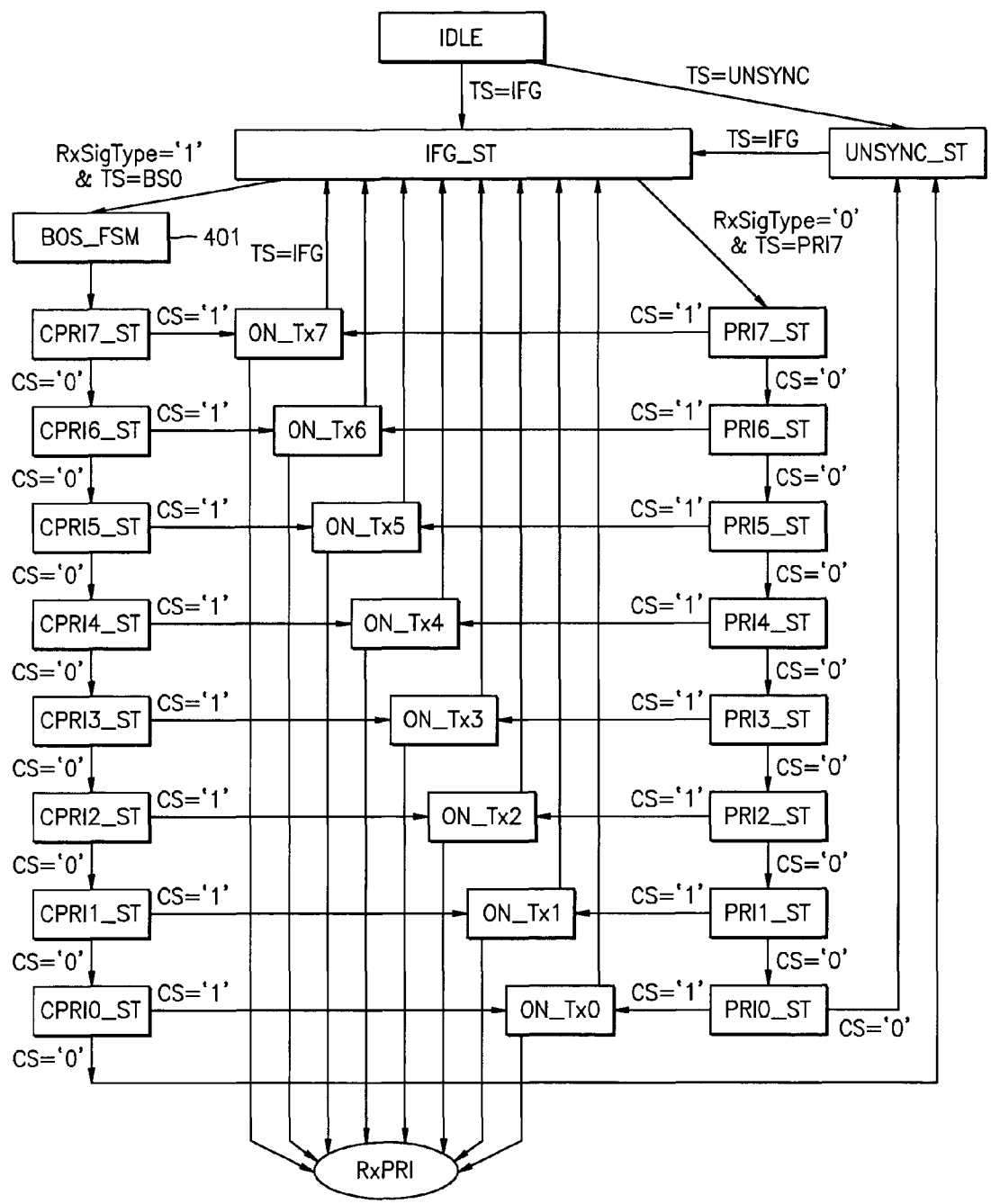
FIG. 4B is a block diagram illustrating the operation of the received frame state extraction unit of FIG. 4A.

FIG. 4B is a state diagram illustrating the operation of the received frame state extraction unit 40.

An idle state denotes the absence of data transmission from a station. If the time slot of the received frame is IFG (TS=IFG), the received frame state extraction unit 40 enters the IFG_ST state. If the time slot is Unsync (TS=UNSYNC), the received frame state extraction unit 40 enters the UNSYNC_ST state so that the stations can transmit data.

ST1: When the current state is IFG_ST, if collision occurs in the received frame (RxSigType='1') and the time slot is the back-off slot BSO (TS=BSO), the received frame state extraction unit 40 enters the BOS_FSM state 401. After extracting the final states of the carrier sense signals according to the state diagram of FIG. 4C, the received frame state extraction unit 40 enters the CPRI7_ST state. The 'C' of the CPRI7_ST state denotes collision. When the current state is IFG_ST, if the received frame is normal (RxSigType='0') and the time slot is PRI7 (TS=PRI7), the received frame state extraction unit 40 enters the PRI7_ST state.

ST2: When a carrier signal is detected in the CPRI7_ST state (CS='1'), the received frame state extraction unit 40 enters the On_Tx7 state to receive a new frame. Otherwise (CS='0'), the received frame state extraction unit 40 enters the CPRI6_ST state. If the time slot is IFG (TS=FIG) during the On_Tx7 state, the received frame state extraction unit 40 enters the IFG_ST state to perform ST1.

ST3: When a carrier signal is detected in the PRI7_ST state (CS='1'), the received frame state extraction unit 40 enters the On_Tx7 state to receive a new frame. Otherwise (CS='0'), the received frame state extraction unit 40 enters the PRI6_ST state. If the time slot is IFG (TS=FIG) during the On_Tx7 state, the received frame state extraction unit 40 enters the IFG_ST state to perform ST1.

ST4: When a carrier signal is detected in the CPRI6_ST state (CS='1'), the received frame state extraction unit 40 enters the On_Tx6 state to receive a new frame. Otherwise (CS='0'), the received frame state extraction unit 40 enters the CPRI5_ST state. If the time slot is IFG (TS=IFG) during the On_Tx6 state, the received frame state extraction unit 40 enters the IFG_ST state to perform ST1. The processes are repeated for the states after the CPRI5_ST state as shown in the state diagram of FIG. 4B. Therefore, the description of the processes will not be repeated.

ST5: When a carrier signal is detected in the PRI6_ST state (CS='1'), the received frame state extraction unit 40 enters the On_Tx6 state to receive a new frame. Otherwise (CS='0'), the received frame state extraction unit 40 enters the PRI5_ST state. If the time slot is IFG (TS=IFG) during the On_Tx6 state, the received frame state extraction unit 40 enters the IFG_ST state to perform ST1. The processes are repeated for the states after the PRI5_ST state as shown in the state diagram of FIG. 4B. Therefore the description of the processes will not be repeated.

Here, the On_Tx0 state through the On_Tx7 state denote the states of receiving new frames. If the time slot is not IFG in each state, the priority RxPRI of the received frame is extracted from the On_Tx0 state through the On_Tx7 state. In other words, the priority 7 is extracted from the On_Tx7 state, the priority 6 is extracted from the On_Tx6 state, and so on.

The received frame state extraction unit 40 extracts the current state of the received frame, such as the IFG state or the back-off state, by using the state diagram of FIG. 4B. The received frame state extraction unit 40 outputs the 8-bits signal CurST which denotes the current state of the received frame to the MBL calculation unit 41 and the BL calculation unit 43.

CurST:
1. Head (upper 4-bit)
   0000(0): IDLE
   0001(1): IFG
   0010(2): BOS
   1010(A): FBOS
   0011(3): CPRI
   0100(4): PRI
   0101(5): OnTx
   0110(6): Unsync
2. Sub (lower 4-bit): a portion determined according to the head
   0111: BOS111, FBOS111, CPRI7_ST, PRI7_ST, OnTx7_ST
   0110: BOS110, FBOS110, CPRI6_ST, PRI6_ST, OnTx6_ST
   0101: BOS101, FBOS101, CPRI5_ST, PRI5_ST, OnTx5_ST
   0100: BOS100, FBOS100, CPRI4_ST, PRI4_ST, OnTx4_ST
   0011: BOS011, FBOS011, CPRI3_ST, PRI3_ST, OnTx3_ST
   0010: BOS010, FBOS010, CPRI2_ST, PRI2_ST, OnTx2_ST 0001: BOS001, FBOS001, CPRI1_ST, PRI1_ST, OnTx1_ST 0000: BOS000, FBOS000, CPRI0_ST, PRI0_ST, OnTx0_ST As described above, the Head portion represents the IDLE state, the IFG time slot, the BOS time slot, the FBOS, the CPRI, the PRI, the OnTx, and the Unsync. The FBOS represents a time section for calculating the MBL values and the BL values using the back-off signals. The CPRI represents the priority slot after collisions and the PRI represents the priority slot in the normal state. The OnTx represents the transmission of frames and the Unsync denotes an Unsynchronous section. In addition, the Sub portion represents detailed state information according to the Head portion.

The MBL calculation unit 41 and the BL calculation unit 43 determine the states of the received frames by using the CurST signals. In addition, the MBL calculation unit 41 and the BL calculation unit 43 obtain the MBL values MBL_reg and the BL values BL_reg based on the method shown in Table 1 and store the values MBL_reg and BL_reg in the MBL registers 42 and the BL registers 44, respectively.

Figure 4C:
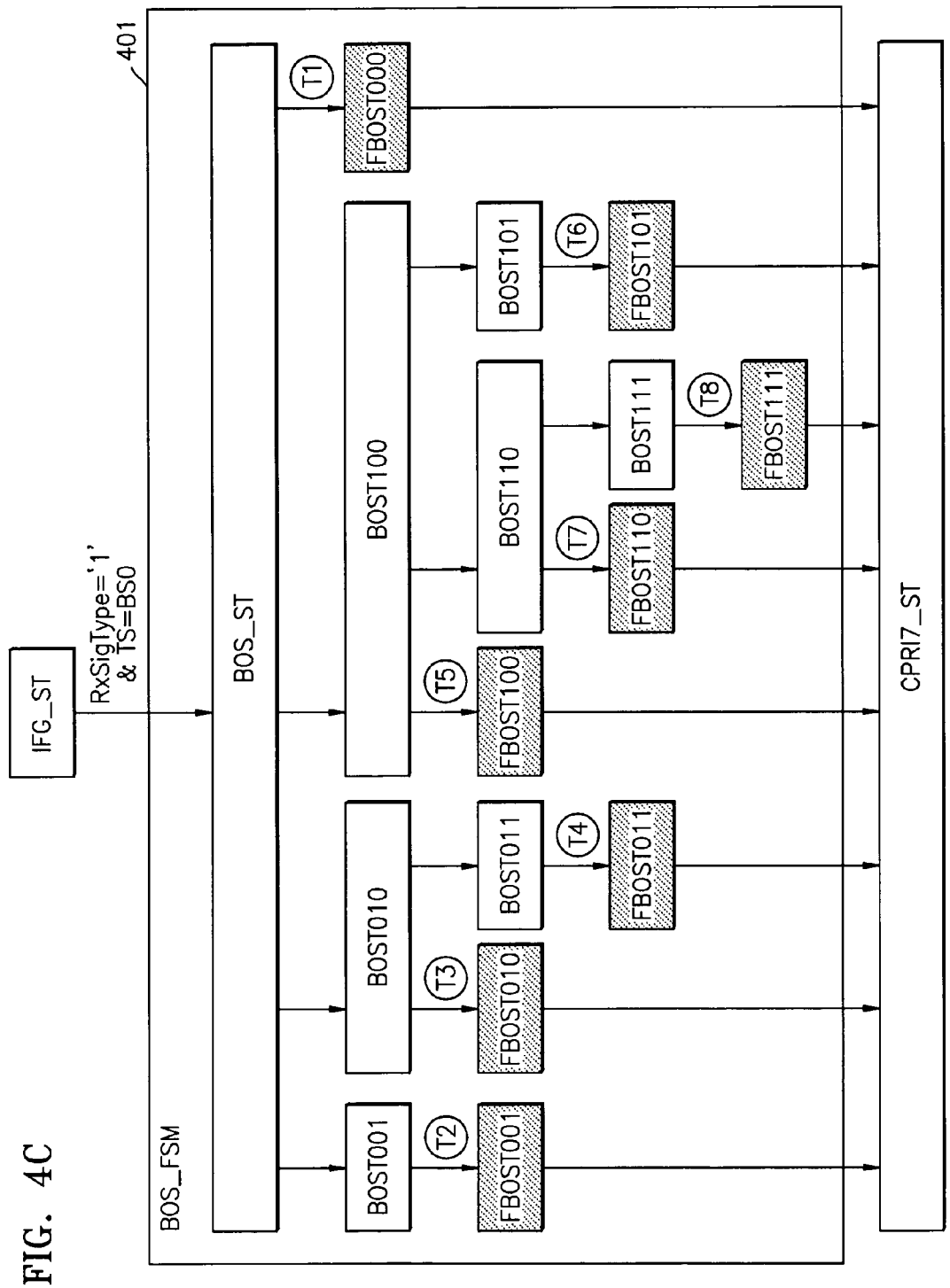
FIG. 4C is a block diagram illustrating the back-off section when a collision occurs in a received frame.

FIG. 4C is a block diagram illustrating the back-off section (BOS_FSM) when a collision occurs (RxSigType='1' and TS=BSO) in a received frame. In FIG. 4C, T1 through T8 denote the CS types of FIG. 3. The final state FBOST000 denotes a case where back-off signals do not occur in the back-off slot section. The final state FBOST001 denotes a case where the back-off signals occur in the back-off slot BS2. The final state FBOST010 denotes a case where the back-off signals occur in the back-off slots BS1. The final state FBOST011 denotes a case where the back-off signals occur in the back-off slots BS1 and BS2. The final state FBOST100 denotes a case where the back-off signals occur in the back-off slot BS0.

The final state FBOSTxxx of the carrier sense signals are determined when the signal do_FBOS is activated. The final state FBOSTxxx is included in the current state signals CurST and transmitted to the MBL calculation unit 41 and the BL calculation unit 43. The state is used to determine the MBL values MBL_reg and the BL values BL_reg using the method shown in FIG. 1. By assigning the reference time signal do_FBOS in the last back-off slot BS2, an error of detecting the carrier sense signals is prevented.

Figure 5A:
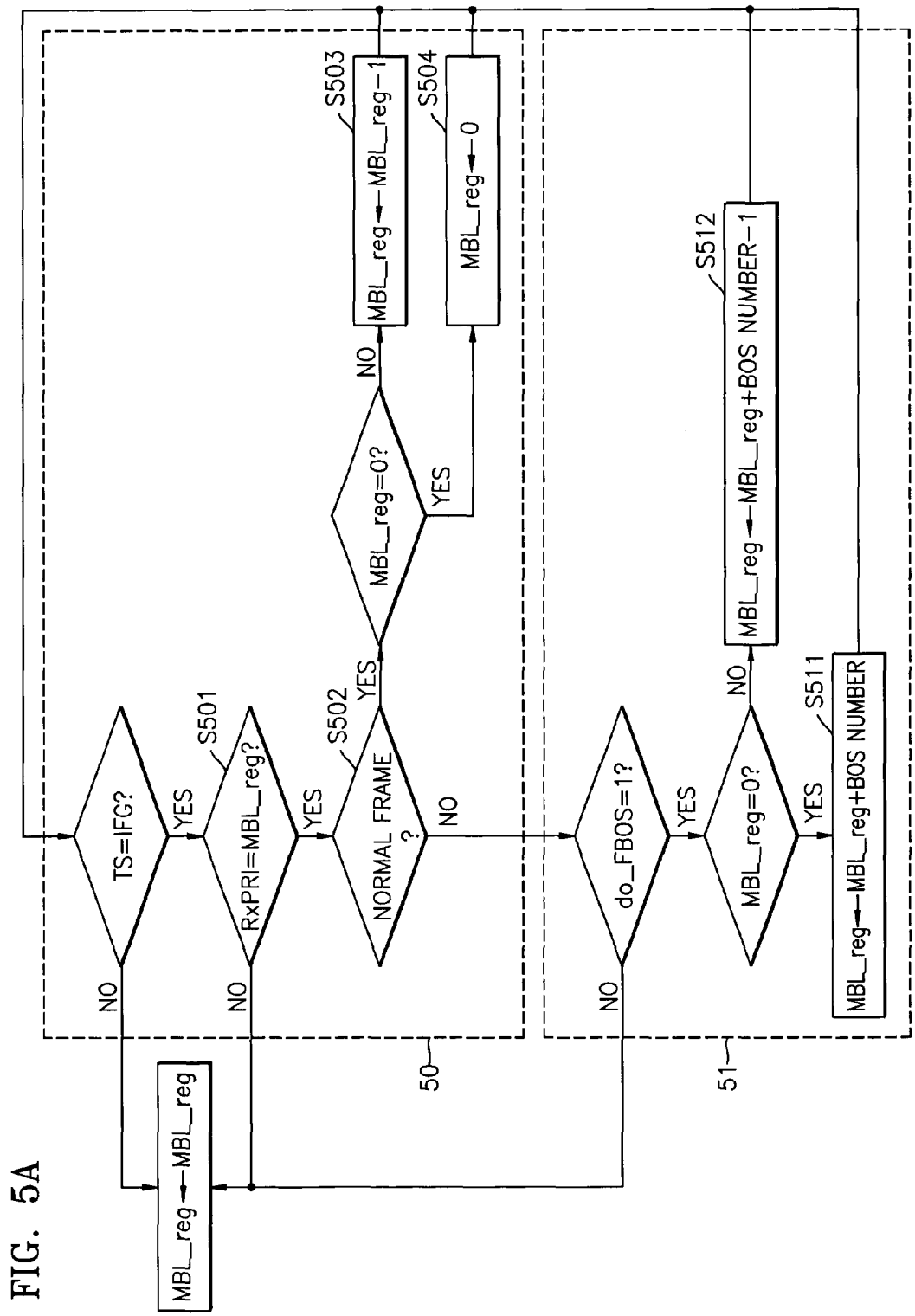
FIG. 5A is a flowchart illustrating how a maximum back-off level (MBL) calculation unit calculates values assigned to MBL registers.

FIG. 5A is a flowchart for illustrating how the MBL calculation unit 41 calculates the MBL values MBL_reg. The flowchart of FIG. 5A should be followed according to the received priority.

The IFG slot region 50 determines whether a received frame is a normal frame and determines the values MBL_reg0 through MBL_reg7 assigned to the MBL registers. In step S501, the priority RxPRI of the received frame and the MBL value MBL_reg of the previous frame are compared. If the values are equal in step 501, it is determined whether the received frame is a normal frame in step 502. If the received frame is recognized as a normal frame and the previous MBL value MBL_reg is 0, a new MBL value MBL_reg is set to 0 in step S504. Otherwise, if the previous MBL value MBL_reg is not 0, a new MBL value MBL_reg is assigned by subtracting 1 from the previous MBL value MBL_reg, as shown in step S503.

The do_FBOS region 51 determines the MBL values MBL_reg in the case where the received frame is recognized as a collision frame as a result of step S502. The MBL values MBL_reg are input to the MBL registers 42 according to the final state FBOSTxxx of the carrier sense signal. In other words, when the MBL value MBL_reg is 0, a new MBL value MBL_reg is obtained by adding the previous MBL value MBL_reg to the number of back-off signals, as depicted in step S511. When the MBL value MBL_reg is not 0, a new MBL value MBL_reg is obtained by adding the previous MBL value MBL_reg to the number of back-off signals and subtracting 1 from the added value, as depicted in step S512.

Figure 5B:
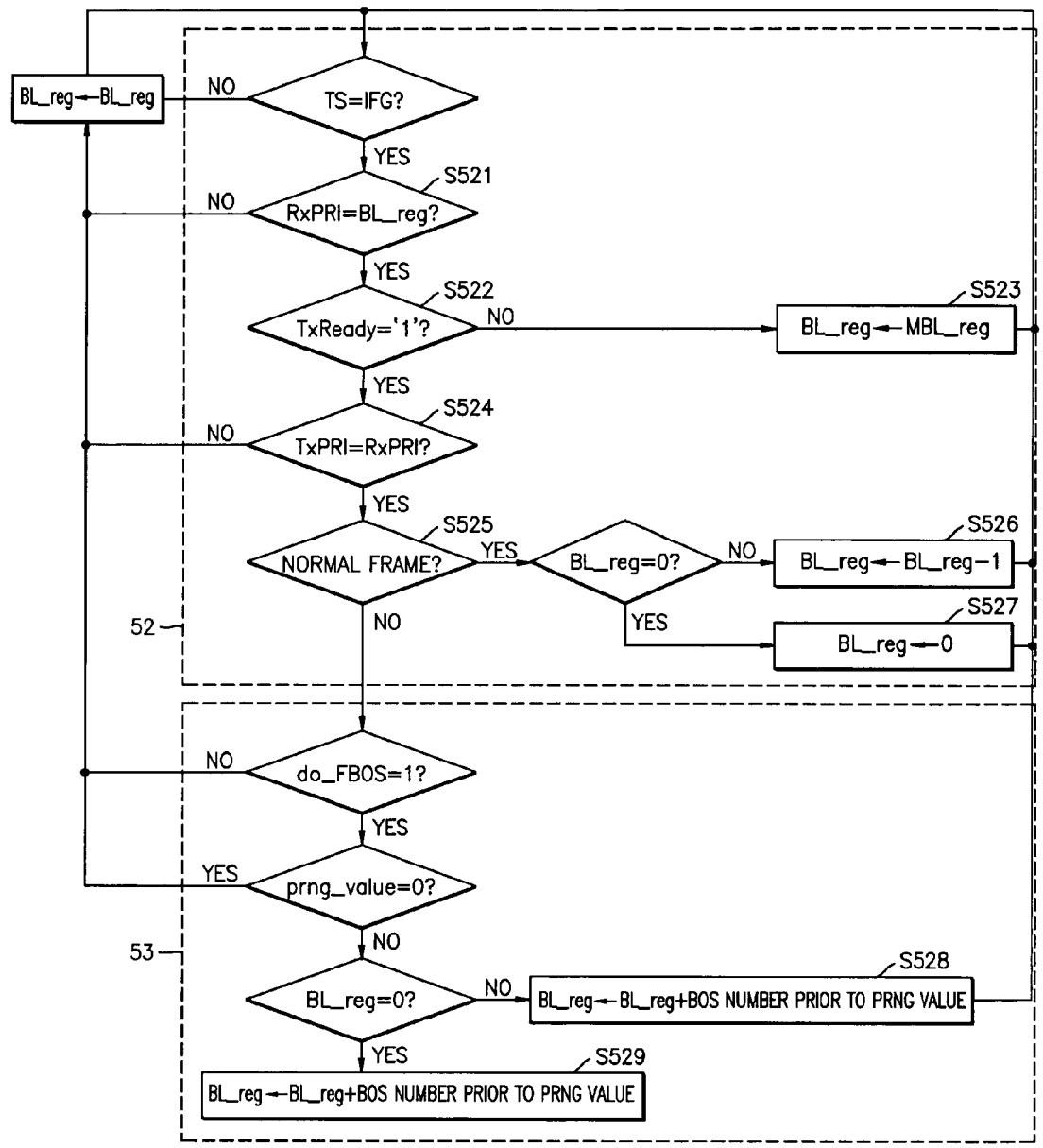
FIG. 5B is a flowchart illustrating how a back-off level (BL) calculation unit calculates values assigned to BL registers.

FIG. 5B is a flowchart illustrating how the BL calculation unit 43 calculates the BL values BL_reg. The flowchart of FIG. 5B should be followed according to the received priority.

The IFG slot region 52 determines whether a received frame is a normal frame and determines the values BL_reg0 through BL_reg7 assigned to the BL register. In step S521, the priority RxPRI of the received frame and the BL value BL_reg of the previous frame are compared. If the values are equal in step 521, step S522 determines whether a corresponding RxPRI station is in a data transmission standby state (TxReady='1'?). If the standby state is detected, the BL value BL_reg of the station, which is in the active state, is assigned by the method shown in Table 1. If the standby state is not determined (TxReady='0'), the BL value BL_reg of the station, which does not transmit data, is the same as the MBL value MBL_reg. Accordingly, the data transmission standby state of the corresponding RxPRI state should be determined. Thus, a transmission standby signal TxReady is input to the BL calculation unit 43, and the BL value BL_reg is changed only when the value of the transmission standby signal TxReady is 1.

When the value of the transmission standby signal TxReady is 0 (TxReady='0'), the BL value BL_reg and the MBL value MBL_reg are the same, as depicted in step S523. When the value of the transmission standby signal TxReady is 1 (TxReady='1'), the transmission priority order TxPRI of a station is compared to the priority RxPRI of the received frame, as depicted in step S524. When the priorities are different in step S524, the previous BL value BL_reg becomes the new BL value BL_reg. When the priorities are equal in step S524, it is determined whether the received frame is a normal frame in step S524. If the received frame is recognized as a normal frame and the previous BL value BL_reg is 0, a new BL value BL_reg is set to 0 in step S527. Otherwise, the previous BL value BL_reg is not 0, a new BL value BL_reg is assigned by subtracting 1 from the previous BL value BL_reg, as shown in step S526.

The do_FBOS region 53 determines the BL value BL_reg in the case where the received frame is recognized as a collision frame, as a result of step S525. In the do_FBOS region 53, BL values BL_reg are assigned to the BL registers 44 according to the final state FBOSTxxx of the carrier sense signals, which is determined as shown in FIG. 4, and by the method shown in Table 1. The BL value BL_reg can be obtained by calculating the number of back-off signals in each station. The station in which collision occurs selects a value from 0, 1, and 2 determined by the PRNG circuit in the MAC layer. A back-off signal corresponding to the selected value is output to the network. Thereafter, the station counts the number of back-off signals that are observed prior to the corresponding back-off slot and adds the number to the BL value BL_reg.

More specifically, when the PRNG value is 0 (prng_value=0), the previous BL value BL_reg becomes the new BL value BL_reg. When the PRNG value is not 0, the new BL value BL_reg is calculated as follows. In step S529, if the BL value BL_reg is 0, the new BL value BL_reg is obtained by adding the previous BL value BL_reg to the number of back-off signals observed prior to the corresponding back-off slot, i.e., the BOS number prior to the PRNG value. In step S528, if the BL value BL_reg is not 0, the new BL value BL_reg is obtained by subtracting 1 from the value which is obtained by adding the previous BL value BL_reg to the number of back-off signals observed prior to the corresponding back-off slot.

Thus, the MAC layer provides collision resolution to the stations with reference to the values stored in the registers 42 and 44 in FIG. 4A.

According to the present invention, the priority slot of the registers is designed to accommodate more than 5 bits supporting 25 numbers and providing collision resolution to a maximum of 25 home networking stations. In addition, incorrect calculation of the number of back-off signals is avoided by using a state machine according to the final state of carrier sense signals. By assigning values to the registers based on the state of the carrier sense signals enhanced collision resolution can be provided.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for collision resolution in a home networking system using carrier sense signals, the apparatus comprising:
   a received frame state extraction unit, which extracts a current state CurST of a frame including carrier sense signals received by a station that is connected to a network, a data transmission priority RxPRI of the received frame, and a reference time signal do_FBOS for determining a final state of the carrier sense signals of the received frame, wherein the reference time signal do_FBOS is assigned to be within a last section in a back-off slot section of the received frame to determine the final state of the carrier sense signals, the back-off slot section to be followed by a priority slot section of the received frame for transmitting data;
   a maximum back-off level (MBL) calculation unit, which calculates MBL values MBL_reg based on the current state CurST, the priority RxPRI, and the reference time signal do_FBOS;
   MBL registers, which store the MBL values MBL_reg;
   a back-off level (BL) calculation unit, which calculates BL values BL_reg based on the current state CurST, the priority RxPRI, the reference time signal do_FBOS, and the MBL values MBL_reg; and
   BL registers, which store the BL values BL_reg.

2. The apparatus of claim 1, wherein when the received frame is determined as a normal frame, if the MBL value MBL_reg of a previous frame is 0, the MBL_reg becomes 0, and if the MBL value MBL_reg of the previous frame is not 0, the MBL value MBL_reg is obtained by subtracting 1 from the MBL value MBL_reg of the previous frame, after it is determined that the priority RxPRI and the MBL value MBL_reg of the previous frame are the same, and when the received frame is determined as a collision frame, if the MBL value MBL_reg of the previous frame is 0, the MBL value MBL_reg is obtained by adding the MBL value MBL_reg of the previous frame to the number of back-off signals of the received frame, and if the MBL value MBL_reg of the previous frame is not 0, the MBL value MBL_reg is obtained by subtracting 1 from the value which is obtained by adding the MBL value MBL_reg of the previous frame to the number of back-off signals.

3. The apparatus of claim 1, wherein when the received frame is determined as a normal frame, if the BL value BL_reg of a previous frame is 0, the BL value BL_reg is set to 0, and if the BL value BL_reg of the previous frame is not 0, the BL value BL_reg is obtained by subtracting 1 from the BL value BL_reg of the previous frame, after it is determined that a corresponding station is in a data transmission standby state and a priority RxPRI of the received frame is the same as a BL value BL_reg of the previous frame;
   when the received frame is determined as a collision frame, if a pseudo random number generator (PRNG) value generated in a PRNG circuit of a media access control (MAC) in the station is 0, the BL value BL_reg of the previous frame becomes the BL value BL_reg;
   when the received frame is determined as a collision frame, if the PRNG value is not 0 and the BL value BL_reg of the previous frame is 0, the BL value BL_reg is obtained by adding the BL value BL_reg of the previous frame to the number of back-off signals that are observed prior to a corresponding back-off slot; and
   when the received frame is determined as a collision frame, if the PRNG value is not 0 and the BL value BL_reg of the previous frame is not 0, the BL value BL_reg is obtained by subtracting 1 from the value which is obtained by adding the BL value BL_reg of the previous frame to the number of back-off signals observed prior to the PRNG value.

4. The apparatus of claim 1, wherein each of the MBL registers and the BL registers are assigned to each of the priority slots of the received frame, and each of the priority slots is designed to accommodate more than 5 bits to provide collision resolution to a maximum of 25 stations.

5. A method for collision resolution in a home networking system using carrier sense signals, the method comprising:
   extracting a current state CurST of a frame including carrier sense signals received by a station that is connected to a network, a data transmission priority RxPRI of the received frame, and a reference time signal do_FBOS for determining a final state of the carrier sense signals of the received frame, wherein the reference time signal do_FBOS is assigned to be within a last section in a back-off slot section of the received frame to determine the final state of the carrier sense signals, the back-off slot section to be followed by a priority slot section of the received frame for transmitting data;
   calculating MBL values MBL_reg based on the current state CurST, the priority RxPRI, and the reference time signal do_FBOS;
   storing the MBL values MBL_reg;
   calculating BL values BL reg based on the current state CurST, the priority RxPRI, the reference time signal do_FBOS, and the MBL values MBL_reg; and
   storing the BL values BL_reg.

6. The method defined by claim 5 wherein said calculating MBL values comprises:
   determining the priority RxPRI and the MBL value MBL_reg of the previous frame are the same;
   determining the received frame as a normal frame;
   determining the MBL value MBL_reg of a previous frame;
   assigning the MBL_reg a value of 0 in response to the MBL value MBL_reg of the previous frame having the value of 0;
   assigning the MBL_reg a value of 1 subtracted from the MBL value MBL_reg of the previous frame in response to the MBL value MBL_reg of the previous frame not having the value of 0;
   determining the received frame as a collision frame;
   obtaining the MBL value MBL_reg by adding the MBL value MBL_reg of the previous frame to the number of back-off signals of the received frame in response to the MBL value MBL_reg of the previous frame having the value of 0; and obtaining the MBL value MBL_reg by subtracting 1 from the value which is obtained by adding the MBL value MBL_reg of the previous frame to the number of back-off signals in response to the MBL value MBL_reg of the previous frame not having the value of 0.

7. The method defined by claim 5 wherein said calculating BL values comprises:

determining a corresponding station is in a data transmission standby state and a priority RxPRI of the received frame is the same as a BL value BL_reg of the previous frame;

determining the received frame as a normal frame;

determining the BL value BL_reg of a previous frame;

assigning the BL value BL_reg a value of 0 in response to the BL value BL_reg of a previous frame having the value of 0;

assigning the BL value BL_reg a value of 1 subtracted from the BL value BL_reg of the previous frame in response to the BL value BL_reg of the previous frame not having the value of 0;

determining the received frame as a collision frame;

obtaining the BL value BL_reg by assigning the BL value BL_reg of the previous frame in response to a pseudo random number generator (PRNG) value generated in a PRNG circuit of a media access control (MAC) in the station having the value of 0;

obtaining the BL value BL_reg by adding the BL value BL_reg of the previous frame to the number of back-off signals that are observed prior to a corresponding back-off slot in response to the PRNG not having the value of 0 and the BL value BL_reg of the previous frame having the value of 0; and obtaining the BL value BL_reg by subtracting 1 from the value which is obtained by adding the BL value BL_reg of the previous frame to the number of back-off signals observed prior to the PRNG value in response to the PRNG not having the value of 0 and the BL value BL_reg of the previous frame not having the value of 0.

* * * * *